US009094938B2

(12) United States Patent
Hu et al.

(10) Patent No.: US 9,094,938 B2
(45) Date of Patent: Jul. 28, 2015

(54) METHOD AND SYSTEM FOR TRANSMITTING DYNAMIC SCHEDULING INFORMATION

(75) Inventors: Jian Hu, Shenzhen (CN); Jianxun Ai, Shenzhen (CN); Zijiang Ma, Shenzhen (CN); Lei Mao, Shenzhen (CN); Bin Wang, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 152 days.

(21) Appl. No.: 13/260,251

(22) PCT Filed: Jan. 28, 2010

(86) PCT No.: PCT/CN2010/070403
§ 371 (c)(1),
(2), (4) Date: Sep. 23, 2011

(87) PCT Pub. No.: WO2011/022958
PCT Pub. Date: Mar. 3, 2011

(65) Prior Publication Data
US 2012/0140692 A1 Jun. 7, 2012

(30) Foreign Application Priority Data
Aug. 25, 2009 (CN) .......................... 2009 1 0168862

(51) Int. Cl.
*H04W 72/00* (2009.01)
*H04L 29/06* (2006.01)
*H04W 4/06* (2009.01)
*H04W 72/12* (2009.01)

(52) U.S. Cl.
CPC ......... *H04W 72/005* (2013.01); *H04L 65/4076* (2013.01); *H04W 4/06* (2013.01); *H04W 72/1289* (2013.01); *Y02B 60/50* (2013.01)

(58) Field of Classification Search
CPC . H04W 72/005; H04W 4/06; H04W 72/1289; Y02B 60/50; H04L 65/4076
USPC ......... 370/310, 312, 315, 316, 319, 321, 322, 370/328, 329, 336, 343, 351, 389, 395.1, 370/395.4; 455/403, 422.1, 450, 452.1, 455/462, 464
See application file for complete search history.

(56) References Cited

U.S. PATENT DOCUMENTS

2005/0237972 A1* 10/2005 Van Dervelde et al. ...... 370/329
2006/0146745 A1 7/2006 Cai et al.
(Continued)

FOREIGN PATENT DOCUMENTS

CN 1816212 A 8/2006
CN 1943138 A 4/2007
(Continued)

OTHER PUBLICATIONS

International Search Report dated Jun. 3, 2010 in application PCT/CN2010/070403.
(Continued)

*Primary Examiner* — Obaidul Huq
(74) *Attorney, Agent, or Firm* — Foley & Lardner LLP

(57) ABSTRACT

The present invention discloses a method for transmitting dynamic scheduling information (DSI) of Multimedia Broadcast Multicast Services (MBMS). A network side bears the dynamic scheduling information (DSI) of Multimedia Broadcast Multicast Services (MBMS) born on a plurality of Multicast Channels (MCH) in one Multicast Broadcast over Single Frequency Network (MBSFN) area on one MCH to send. User Equipment (UE) reads scheduling information of MBMS born on each MCH in said MBSFN area from the MCH bearing a plurality of pieces of DSI placed together or one piece of DSI combined, and receives the MBMS born on different MCHs according to read scheduling information. The present invention further provides a network side device of a system supporting to transmit dynamic scheduling information and a corresponding system.

11 Claims, 3 Drawing Sheets

(56) References Cited

U.S. PATENT DOCUMENTS

| | | |
|---|---|---|
| 2008/0205322 A1 | 8/2008 | Cai et al. |
| 2009/0016254 A1* | 1/2009 | Lee et al. .................. 370/312 |
| 2010/0322133 A1* | 12/2010 | Kuo .......................... 370/312 |
| 2011/0013574 A1* | 1/2011 | Hsu .......................... 370/329 |
| 2011/0026522 A1* | 2/2011 | Hsu .......................... 370/390 |
| 2011/0194428 A1* | 8/2011 | Wang et al. ............... 370/252 |
| 2012/0163286 A1* | 6/2012 | Huschke et al. ........... 370/315 |

FOREIGN PATENT DOCUMENTS

| | | |
|---|---|---|
| CN | 101483810 A | 7/2009 |
| EP | 2 068 492 A1 | 6/2009 |
| WO | WO-2008/151069 A1 | 12/2008 |

OTHER PUBLICATIONS

European Search Report, dated Oct. 22, 2013, from related EP Patent Application No. 10811124.6.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9)" 3GPP Standard, 3GPP TS 36.300, 3rd Generation Partnership Project, Mobile Competence Centre, 650, Route Des Lucioles, F-06921 Sophia-Antipolis Cedex, France, No. V9.0.0, Jun. 2009 (XP050377586).

Alcatel-Lucent Shanghai Bell, et al.: "Service Multiplexing and Signalling for eMBMS", 3GPP Draft, R3-091301_Servicemux, 3GPP TSG-RAN WG3 Meeting, #64, No. San Francisco, USA, May 2009 (XP050341653).

Huawei: "MBMS Dynamic Scheduling", 3GPP Draft, R2-092962 Dynamic Scheduling in the MSAP Occasion, 3GPP TSG-RAN WG2 Meeting, #66, No. San Francisco, USA, May 2009 (XP050340756).

Research in Motion Limited: "MBMS Multiplexing", 3GPP, R2-074044, 3GPP TSG-RAN WG2 Meeting, #59bis, No. Shanghai, China, Oct. 2007 (XP050136679).

US Notice of Allowance date May 8, 2014, from related U.S. Appl. No. 13/260,255.

* cited by examiner

METHOD AND SYSTEM FOR TRANSMITTING DYNAMIC SCHEDULING INFORMATION

TECHNICAL FIELD

The present invention relates to the Long Term Evolution (LTE) system, and particularly, to a method and system for transmitting dynamic scheduling information.

BACKGROUND OF THE RELATED ART

With the rapid development of the Internet and the popularization of the mobile phone with the large screen and multiple functions, a large quantity of mobile data multimedia services and various broad bandwidth multimedia services occur, such as the video conference, television broadcast, video on demand, advertisement, online education, and interactive game and so on, which not only satisfies the continuously increased service demand of the mobile user, but also brings new service increasing points for mobile operators at the same time. These mobile data multimedia services need that a plurality of users are able to receive the same data at the same time, and comparing with the common data service, these mobile data multimedia services have features of large data quantity, long duration, and sensitive time delay and so on.

In order to effectively utilize the mobile network resources, the 3rd Generation Partnership Project (3GPP) proposes the Multimedia Broadcast Multicast Service (MBMS), and this service is a technique of transmitting data from one data source to a plurality of destinations, which implements to share the network (including the core network and the access network) resources, and improves the utilization ratio of the network resources (especially the air interface resources). The MBMS defined by the 3GPP is not only able to implement the pure text and low speed message classified multicast and broadcast, but also able to implement the multicast and broadcast of the high speed multimedia service, and provide various rich video, audio and multimedia services, which undoubtedly complies with the trend of the development of the future mobile data, and provides a better service prospect for the development of the 3G.

In the LTE, the MBMS service can adopt a way of the multicast mode, which is called as the Multicast/Broadcast over Single Frequency Network (MBSFN) sending mode, and the MBMS service sent by adopting the multicast mode is also called as the MBSFN service, which is able to adopt the same modulation and coding format in a plurality of cells, and adopt the same physical resources to send the same content, and the features of the MBMS cell transmission are as follows:

1) synchronization transmission in the MBSFN area; 2) the MBMS transmission combination of multiple cells is supported; 3) the Multicast Traffic Channel (MTCH) and the Multicast Control Channel (MCCH) are mapped into the Multicast Channel (MCH) in the point to multipoint (p-T-m) mode; 4) the MBSFN synchronization area, MBSFN area, MBSFN transmission, advertisement, and reserved cell are all maintained in the semi-static configuration by operations.

Thus, User Equipment (UE) of a plurality of cells can receive a plurality of MBMS data with the same content and carry out the Single Frequent Network (SFN) combination, thereby being able to improve the gain of the receiving signal. A plurality of cells adopting the same physical resources and sending the same MBMS service in the MBSFN sending mode composes one MBSFN area.

In the practical LTE networking, one MBSFN area has a plurality MBSFN services, and all the MBSFN services belonging to one MBSFN area are called as one MBSFN service group, and that is to say one MBSFN service group only belonging to one MBSFN area. One MBSFN area comprises a plurality of cells, and each cell is configured with one completely same MBSFN service group. The data channel MTCH of a plurality of MBSFN services with the same MBSFN area and the control channel MCCH of the MBSFN services can be multiplexed to one Multicast Channel (MCH). The MCCH and a plurality of MTCHs of the same MBSFN area namely a plurality of logic channels can be mapped into the same one transmission channel MCH.

In the LTE system, the MCH is a transmission channel, of which the feature is that point to multipoint transmission is carried out, and the corresponding physical resources are the multicast resources allocated by the system for transmitting the MBMS services (MTCH), and one MCH is born on a plurality of multicast resources, and these multicast resources comprise a plurality of MBSFN frames and MBSFN subframes, as shown in FIG. 1, ▨ denotes the non MBSFN frame, ☐ denotes the MBSFN frame, ▨ denotes the non MBSFN subframe, ▯ denotes the MBSFN subframe, and ▤ denotes the fixedly unavailable. These multicast resources adopt a suit of MBSFN subframe allocation patterns (MSAP) to be configured, including the radio frame allocation pattern and the radio subframe allocation pattern, and the multicast resources of each MBSFN area can be divided into a plurality of groups taking the subframe as an unit according to a certain pattern, and each group can compose one MCH or a plurality of groups composes one MCH. Then the used pattern composing each MCH is called as the MSAP of this MCH, and one MSAP describes the physical resources of one MCH channel. Each cell can have one or more MCHs, and each MCH uniquely corresponds to one MSAP, and uniquely belongs to one MBSFN area, however, each MBSFN area can have one or more MCHs, and the method for configuring the multicast resources configured by each MCH is to configure one suit of MSAP for each MCH.

As shown in FIG. 2, in order to improve the sending efficiency of the MTCH, a plurality of MTCHs born on each MCH can adopt the dynamic scheduling method, and 2 or more than 2 MTCHs can be multiplexed on the same MBSFN subframe and occupy part of resources of this subframe by the dynamic scheduling, and FIG. 2(a), FIG. 2(b) and FIG. 2(c) are the schematic diagrams of the resource allocation of the Scheduling Period 1, Scheduling Period 2, and Scheduling Period 3 respectively. In the public prior art, the MSAP occasion is introduced into the MSAP concept at the same time, which indicates all the multicast resources included in one MCH corresponding to a certain MSAP in the time period of one scheduling period (namely a time period on the radio interface, a plurality of services are sent on the MBSFN subframe scheduling resources included in the scheduling period according to an order in sequence). A plurality of MTCHs and the Dynamic Scheduling Information (DSI, which is also briefly called as scheduling information in the present invention) of these MTCHs can be sent in one MSAP occasion. The dynamic scheduling information refers to the information of the specific location information of the service in the scheduling period, and the dynamic scheduling information can be sent in the scheduling period, or sent in the previous one or more scheduling periods of the scheduling period, and generally the scheduling information should be sent to the UE before sending the service data and the MCCH in the scheduling period indicated by the scheduling information, and the scheduling information can be born on the Medium Access Control (MAC) control element. The length of the MSAP occasion is generally fixed to 320 ms. Similarly, one scheduling period is generally fixed to 320 ms, and also can be $2^n \times 320$ ms (n=−3, −2, −1, 0, 1, 2, 3, 4, . . . , N), accordingly, the time length of the MSAP occasion is 40 ms, 80 ms, 160 ms, 320 ms, 640 ms, and 1280 ms and so on, and the time length of one MSAP occasion is one scheduling period, and also can be called as one scheduling period. One or more MBSFN subframes in one or more MBSFN frames are allocated to one MCH through the MSAP, wherein the subframe sent by adopting the multicast mode is called as the MBSFN subframe, and the frame including the MBSFN subframe is called as the MBSFN frame. One MBSFN area has a plurality of MCHs, and each MCH has its own scheduling period, which is also called as the MSAP occasion, and the scheduling periods of different MCHs can be the same or can also be different.

In the prior art, each MCH has one schedule block bearing its dynamic scheduling information (DSI) as shown in FIG. 2, and generally the DSI is born on the MAC Service Data Unit (SDU), and is configured before its scheduled MCH, as shown in FIG. 3.

Each MSAP occasion configured for one MCH bears the scheduling information, including the mapping information from the MTCH to the MSAP subframe, and this type of mapping information is determined by means of the index relationship of the MBSFN subframe number in one scheduling period, and UE can know which MBSFN subframes each MTCH is allocated to by reading scheduling information. UE can read its interested MTCH on the corresponding MBSFN subframes, and ignore the MBSFN subframes which do not require reading, thereby improving the MBMS service receiving efficiency of the UE, and saving the power consumption of the UE. Herein said MBSFN subframe number is determined in this way: ordering all the MBSFN subframes allocated in one scheduling period by one MCH according to an order, and numbering all the MBSFN subframes in sequence. For example, the total number of the MBSFN subframes allocated in one period by a MCH channel is 100, and then the subframe numbers are from 0 to 99 or from 1 to 100.

In the existing LTE technique, a plurality of transmission channels multiplex the MCH channel in a following way: one subframe corresponding to one Transmission Time Interval (TTI), one output data block being able to be sent in one TTI, and corresponding to one Media Access Control Protocol Data Unit (MAC PDU). One MAC PDU can include a plurality of MAC SDUs and MAC control elements (MAC CEs), and these MAC SDUs can come from different logic channels, and possible logic channels include the MTCH, MCCH, and MSCH and so on, and the MAC CE can bear dynamic scheduling information. These data from different logic channels are concatenated together and then are sent together in the physical channel. In order to differentiate the MAC SDUs from the different logic channels, the MAC PDU includes the identification information, and specifically includes the identifier of the logic channel, and the location information of the data block of this logic channel in the MAC PDU and so on, which is used for the receiving end differentiating the data blocks of different logic channels.

Since the areas of transmitting the MBMS service are different, a plurality of MCHs are likely to exist in a certain cell, and respectively bears the services belonging to different MBMS service areas; besides, since the Quality of Service (QoS) attributes of services are different, one MBSFN area is also likely to be configured with a plurality of MCHs, and each MCH respectively is configured with the different Modulation Coding Schemes (MCS), and respectively bears the MBMS service with different QoS requirement, and also includes the MCCH and DSI with the special QoS requirement. In a scenario of a plurality of MCHs existing, how to send the scheduling information and select the corresponding MCS requires designing.

SUMMARY OF THE INVENTION

The technical problem to be solved in the present invention is to provide a method and system for transmitting dynamic scheduling information, which indicates the service scheduling information of User Equipment (UE), and is suitable for the scenario of a plurality of MCHs existing.

In order to solve the above problem, the present invention provides a method for transmitting dynamic scheduling information, comprises:

a network side bearing the dynamic scheduling information (DSI) of Multimedia Broadcast Multicast Services (MBMS) born on a plurality of Multicast Channels (MCH) in one Multicast Broadcast over Single Frequency Network (MBSFN) area on one MCH to send;

wherein the step of said network side bearing a plurality of pieces of DSI on one MCH to send comprises:

said network side bearing said a plurality of pieces of DSI on one MCH to send after placing said a plurality of pieces of DSI together; or said network side bearing said a plurality of pieces of DSI on one MCH to send after combining said a plurality of pieces of DSI into one piece of DSI.

Said network side sends the DSI of this MCH at the occasion of a scheduling period of each MCH own respectively.

Said network side also sends a plurality of pieces of DSI placed together or one piece of DSI combined at a unified scheduling period of all the MCHs of said MBSFN area; wherein said unified scheduling period is a shortest scheduling period in scheduling periods of all the MCHs of said MBSFN area, or is a greatest common divisor of the scheduling periods of all the MCHs of said MBSFN area.

The method further comprises:

said network side allocating MBSFN subframe resources for a plurality of MCHs of said MBSFN area; wherein an allocation period is a longest scheduling period in scheduling periods of all the MCHs of said MBSFN area, or is a least common multiple of scheduling periods of all the MCHs of said MBSFN area.

The step of said network side bearing a plurality of pieces of DSI on one MCH comprises:

said network side bearing said a plurality of pieces of DSI placed together or said one piece of DSI combined on a Media Access Control Control Element (MAC CE) of one or more MBSFN subframes of said one MCH to send.

The method further comprises:

said network side bearing said a plurality of pieces of DSI placed together or said one piece of DSI combined and a Multicast Control Channel (MCCH) on a same MBSFN subframe or different MBSFN subframes; and selecting a corresponding Modulation Coding Scheme (MCS) for said a plurality of pieces of DSI placed together or said one piece of DSI combined, wherein when said a plurality of pieces of DSI placed together or said one piece of DSI combined and said MCCH are born the same MBSFN subframe, said network side takes a MCS of said MCCH as the MCH of said a plurality of pieces of DSI placed together or said one piece of DSI combined; or when said a plurality of pieces of DSI placed together or said one piece of DSI combined and said MCCH are born on different subframes, said network side adopts one of following ways to determine the MCS of said a plurality of pieces of DSI placed together or said one piece of DSI combined:

configuring one MCS for said a plurality of pieces of DSI placed together or said one piece of DSI combined in content of said MCCH or a system broadcast message; or using a MCS of a MCH multiplexed with a Multicast Traffic Channel (MTCH) together as the MCS of said a plurality of pieces of DSI placed together or said one piece of DSI combined; or taking the MCS of said MCCH as the MCS of said a plurality of pieces of DSI placed together or said one piece of DSI combined.

The method further comprises:

when user equipment is required to receive MBMS services, said user equipment reading scheduling information of the MBMS services born on each MCH in said MBSFN area from the MCH channel bearing a plurality of pieces of DSI placed together or said one piece of DSI combined, and receiving the MBMS services born on different MCHs according to said scheduling information which is read.

The present invention further provides a network side device of a system for supporting to transmit dynamic scheduling information, and said network side device is configured to bear the dynamic scheduling information (DSI) of Multimedia Broadcast Multicast Services (MBMS) born on a plurality of Multicast Channels (MCH) in one Multicast Broadcast over Single Frequency Network (MBSFN) area on one MCH to send; wherein, said network side device is to bear a plurality of pieces of DSI on one MCH to send after placing said a plurality of pieces of DSI together or bear said a plurality of pieces of DSI on one MCH to send after combining said a plurality of pieces of DSI into one piece of DSI.

Said network side device can send the DSI of this MCH at the occasion of a scheduling period of each MCH own respectively.

Said network side device also can send a plurality of pieces of DSI placed together or one piece of DSI combined at a unified scheduling period of all the MCHs in said MBSFN area; wherein said unified scheduling period is a shortest scheduling period in scheduling periods of all the MCHs of said MBSFN area, or is a greatest common divisor of scheduling periods of all the MCHs of said MBSFN area.

Said network side device is further configured to: allocate MBSFN subframe resources for a plurality of MCHs of said MBSFN area; wherein an allocation period is a longest scheduling period in scheduling periods of all the MCHs of said MBSFN area, or is a least common multiple of scheduling periods of all the MCHs of said MBSFN area.

Said network side device can bear said a plurality of pieces of DSI placed together or said one piece of DSI combined on a Media Access Control Control Element (MAC CE) of one or more MBSFN subframes of said one MCH to send.

Said network side device is further configured to:

bear said a plurality of pieces of DSI placed together or said one piece of DSI combined and a Multicast Control Channel (MCCH) on a same MBSFN subframe or different MBSFN subframes; and when said a plurality of pieces of DSI placed together or said one piece of DSI combined and said MCCH are born the same MBSFN subframe, take a MCS of said MCCH as the MCS of said a plurality of pieces of DSI placed together or said one piece of DSI combined; or when said a plurality of pieces of DSI placed together or said one piece of DSI combined and said MCCH are born on different subframes, adopt one of following ways to determine the MCS of said a plurality of pieces of DSI placed together or said one piece of DSI combined:

configuring one MCS for said a plurality of pieces of DSI placed together or said one piece of DSI combined in content of said MCCH or a system broadcast message; or using a MCS of a MCH multiplexed with a Multicast Traffic Channel (MTCH) together as the MCS of said a plurality of pieces of DSI placed together or said one piece of DSI combined; or taking the MCS of said MCCH as the MCS of said a plurality of pieces of DSI placed together or said one piece of DSI combined.

The present invention further provides a system for transmitting dynamic scheduling information, which comprises the above network side device and user equipment, wherein said user equipment is configured to: read scheduling information of MBMS services born on each MCH in said MBSFN area from the MCH bearing said scheduling information when the MBMS services require receiving, and receive the MBMS services born on different MCHs according to said scheduling information which is read.

The technical scheme of the present invention provides a scheme for transmitting dynamic scheduling information of the MBMS service regarding the scenario of a plurality of MCHs existing, which enables the receiving end to correctly obtain the specific location information of the MBMS service requiring receiving in one scheduling period, and specifically, when the UE is required to receive a plurality of MBMS services at the same time, the UE can obtain the dynamic scheduling information of these MBMS services at a time, thereby avoiding the UE reading the dispersed dynamic scheduling information at a plurality of times, saving the power of the UE, improving the receiving efficiency, and having a higher sending efficiency of the radio interface signaling.

BRIEF DESCRIPTION OF DRAWINGS

FIG. 2 (*b*) is a schematic diagram of resource allocation of the Scheduling Period 2;

FIG. 2 (*c*) is a schematic diagram of resource allocation of the Scheduling Period 3;

PREFERRED EMBODIMENTS OF THE PRESENT INVENTION

Figure 1:
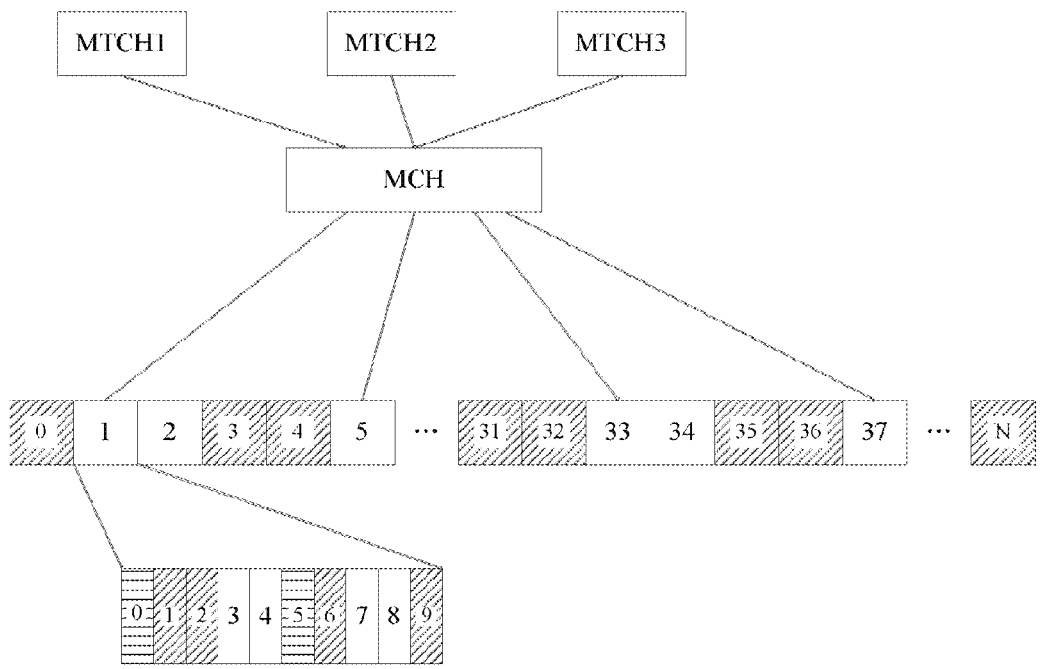
FIG. 1 is a schematic diagram of the multicast resources allocated in the MSAP occasion of the MCH in the related art.
Figure 2A:
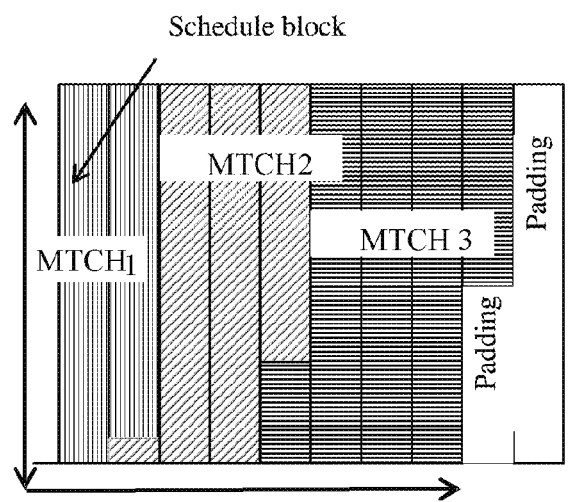
FIG. 2 (*a*) is a schematic diagram of resource allocation of the Scheduling Period 1.
Figure 2B:
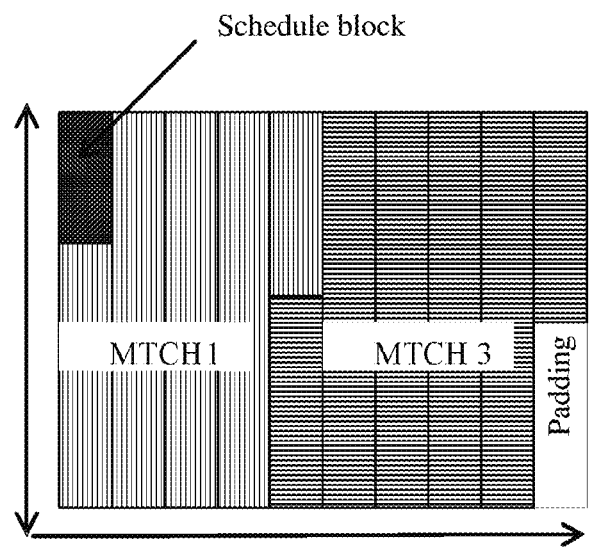
Figure 2C:
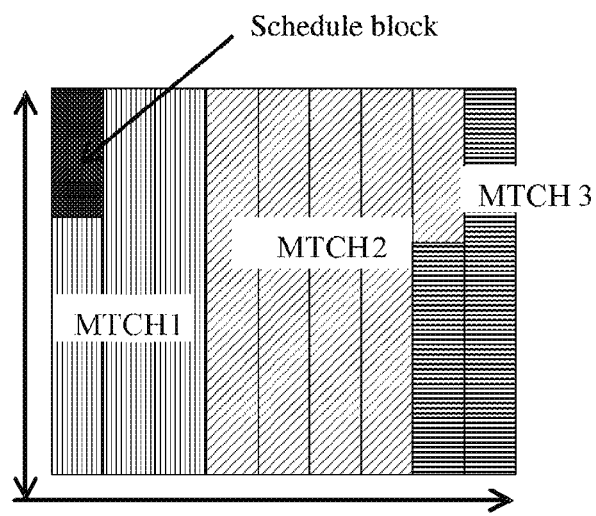
Figure 3:
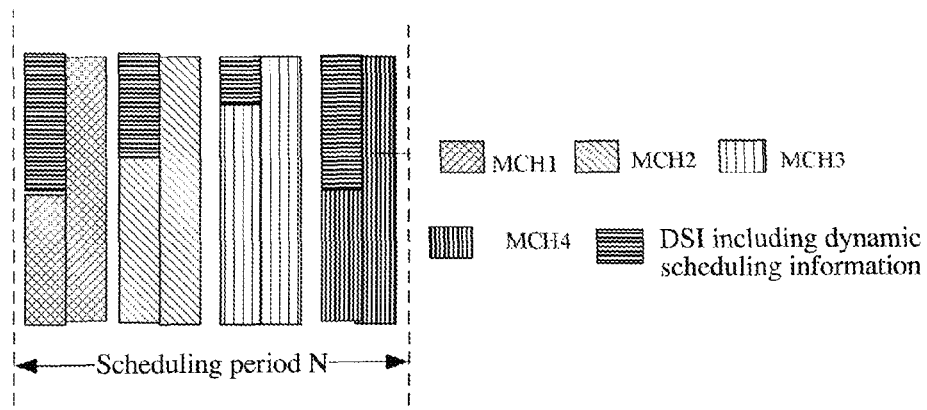
FIG. 3 is a schematic diagram of the configuration of the dynamic scheduling information of a plurality of MCHs in the related art.

Below it will describe the technical scheme of the present invention in detail with reference to the figures and examples.

Example one, a method for transmitting dynamic scheduling information, and comprises:

the network side bearing the Dynamic Scheduling Information (DSI, which is also briefly called as scheduling information in the present invention) of MBMS services born on a plurality of MCHs in one MBSFN area on one MCH to send.

In this example, a plurality of pieces of said DSI (each piece of DSI corresponds to the dynamic scheduling information of one MCH) being born on one MCH to send refers that a plurality of pieces of DSI is born on one MCH to send after uniformly being placed together; a plurality of pieces of DSI uniformly placed together is briefly called as DSI-a, and DSI-a is essentially still a plurality of pieces of DSI, wherein each piece of DSI respectively corresponds to the content of the dynamic scheduling information of each MCH.

In this example, a plurality of pieces of said DSI being born on one MCH to send also can refer to combining a plurality of pieces of said DSI into one DSI and then bearing it on one MCH to send, and the combined DSI is called as the DSI-b for convenient description; the DSI-b is essentially one piece of DSI, and the contents of the DSI-b include the contents of a plurality of pieces of original DSI, namely, the DSI-b includes dynamic scheduling information of MBMS services born on all the MCHs of this MBSFN area. One MBSFN area can have one or more MCHs, but this MBSFN area only has one piece of DSI (DSI-b), and this piece of DSI-b includes the dynamic scheduling information of all the MBMS services on all the MCHs in this MBSFN area.

In this example, said DSI-a and said DSI-b are uniformly called as the DSI-t, and the DSI-t refers to one or more pieces of DSI sent by bearing them on one MCH.

There are a plurality of MCHs in one MBSFN area, and the numbers are 1, 2, . . . , N, and N is the maximum number of MCHs in one MBSFN area. Each MCH has one Scheduling period, also called as the MSAP occasion. Each MCH uniquely corresponds to one piece of dynamic scheduling information DSIn, and MCHn←→DSIn (n=1, 2, . . . , N). In this example, when the DSI-a mode is adopted to send the DSI, said network side also sends the DSI of this MCH at the scheduling period of each MCH own respectively. Since the scheduling periods of various MCHs are different, the number of the pieces of DSI of each MCH is possibly different in the DSI-a. In this example, when the DSI-b mode is adopted to send the DSI, said network side sends the DSI of this MCH at the scheduling period of each MCH own respectively, and since the scheduling periods of various MCHs are different, the contents of the DSI in the DSI-b are possibly different, and that is to say that there is only the scheduling information of the scheduled MCH in DSI-b.

In this example, the shortest scheduling period in the scheduling periods of all the MCHs in one MBSFN area is called as the unified scheduling period, and the unified scheduling period=min{SP1, SP2, . . . SPn}, wherein the SPn is the scheduling period of the $n^{th}$ MCH, and the unified scheduling period also can be the greatest common divisor of the scheduling periods of all the MCHs. For example, there are 5 MCHs in one MBSFN area, and the scheduling periods of these MCHs are respectively 160 ms, 320 ms, 640 ms, 320 ms and 160 ms, and the unified scheduling period of all the MCHs in this MBSFN area is 160 ms; said network side sends said DSI-t on the unified scheduling period of all the MCHs in one MBSFN area.

Figure 5:
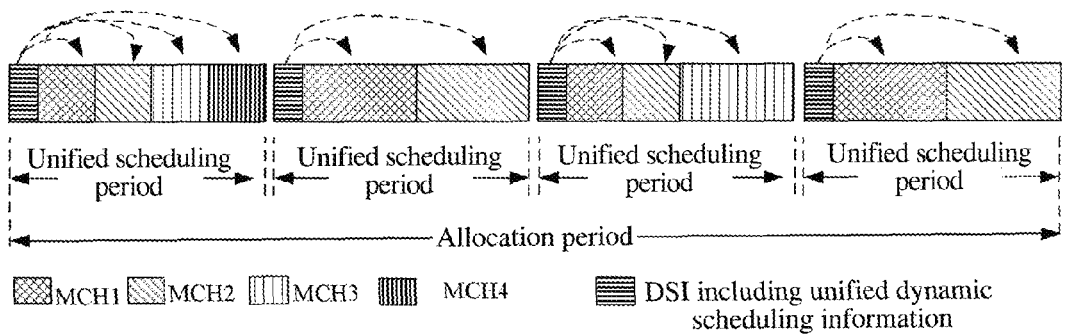
FIG. 5 is a schematic diagram of uniformly sending the DSI according to the present invention.

When the network side allocates MBSFN subframe resources for a plurality of MCHs in one MBSFN, the network side takes the maximal value of the scheduling periods of these MCHs as a period to allocate the MBSFN subframe resources, and the allocation period is max{SP1, SP2, . . . , SPn}, wherein SPn is the scheduling period of the $n^{th}$ MCH, and the allocation period also can be the least common multiple of the scheduling periods of all the MCHs, as shown in FIG. 5.

In this example, the network side bears said DSI-t on one or more MBSFN subframes to send. This or these subframes have one or more MAC CEs bearing the DSI, and if it is the DSI-a, this MAC PDU has a plurality of MAC CEs bearing the DSI, and if it is the DSI-b, this MAC PDU has one MAC CE bearing the DSI.

In this example, the DSI-a or DSI-b use the same one MCS, and that is to say that one or more MBSFN subframes bearing the DSI-a or DSI-b use the same MCS.

In this example, said network side bears the DSI-t and MCCH on the same or different MBSFN subframes;

when the DSI-t and MCCH are born on the same MBSFN subframe, said network side takes the MCS of said MCCH as the MCS of said DIS-t;

when the DSI-t and MCCH are born on the different MBSFN subframes, said network side adopts one of the following ways to determine the MCS of said DIS-t:

configuring one MCS for said DSI-t in said MCCH contents or the system broadcast message;

using the MSC of the MCH multiplexed with the MTCH as the MCS of said DSI-t;

taking the MCS of said MCCH as the MCS of said DSI-t.

In this example, the network side selects the corresponding MCS for the DSI-t by the above method.

In this example, said method further comprises:

when UE is required to receive the MBMS service, UE reading the scheduling information of the MBMS services born on each MCH in this MBSFN area on the MCH channel bearing the DSI-t, and receiving the MBMS services born on different MCHs according to the read scheduling information.

UE and the network side device can agree or default which MCH channel to bear said DSI-t on.

In this example, when the DSI-t and MCCH are multiplexed on one MCH, both of the DSI-t and MCCH use the same MCS, and this MCS can be obtained by reading the MCS of the MCCH on the system broadcast message;

when the DSI-t is not multiplexed with the MCCH on one MCH, the MCS of the DSI-t can be obtained by reading the MCS of the MCH bearing the DSI-t on the MTCH;

when the DSI-t is not multiplexed with the MCCH on one MCH, the MCS of the DSI-t can be obtained by reading the MCS of the DSI-t bearing on the MCCH or on the system broadcast message. In this method, said network side is required to configure one MCS in contents of the MCCH or system broadcast message for the DSI-t.

when the DSI-t is not multiplexed with the MCCH on one MCH, the MCS of the DSI-t also can be obtained by reading the MCS of the MCCH on the system broadcast message, and at this time, the DSI-t is the same as the MCS of the MCCH, no matter whether DSI-t and the MCS of the MCCH are born on one MCCH.

Figure 4:
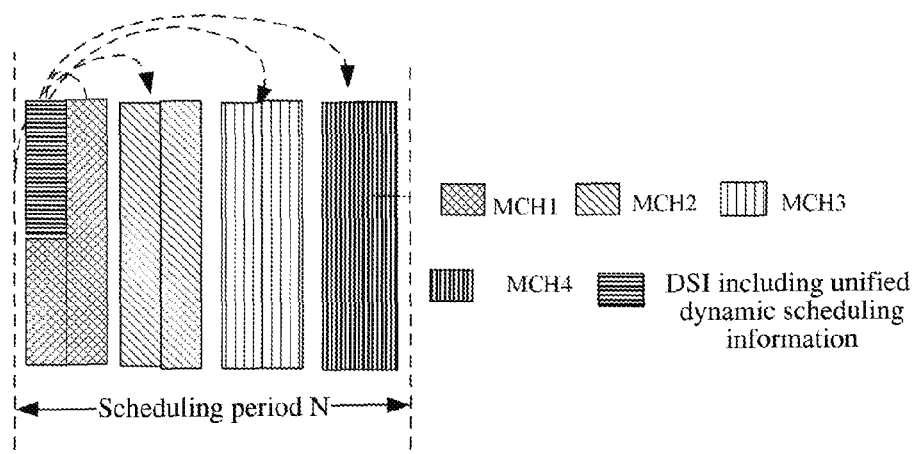
FIG. 4 is a schematic diagram of uniformly configuring the dynamic scheduling information of a plurality of MCHs together in the present invention.

Below it will illustrate one application example for transmitting dynamic scheduling information in combination with FIG. 4, and this application example is shown in FIG. 4, and it is assumed that one MBSFN area has 4 MCHs for bearing the MBMS, which are MCH1, MCH2, . . . , MCH4 respectively. One MCH therein bears the DSI-t, and also can bear the MCCH and MTCHs. The scheduling periods of MCHs are successively 160 ms, 160 ms, 320 ms and 640 ms, respectively responding to MCH1, MCH2, . . . , MCH4, and then the unified scheduling period of these 4 MCHs is 160 ms, namely the unified scheduling period is the minimal value or the greatest common divisor of the scheduling periods of all the MCHs. At the same time, the allocation period of these 4 MCHs is 640 ms, namely the allocation period is the maximal value or the least common multiple of the scheduling periods of all the MCHs. At this time, the allocation period 640 ms includes 4 unified scheduling periods, as shown in FIG. 4.

Following steps are comprised:

(1) the network side device uniformly bears the scheduling information DSI-t of the MBMS service born on each MCH in one MBSFN area on one MCH to send in each said unified scheduling period.

In one allocation period, contents of the DSI-t on 4 unified scheduling periods (160 ms) all have the scheduling information of the MCH1 and MCH2, and the DSI-t of the first unified scheduling period (160 ms) has contents of the scheduling information of used 4 MCHs; the second unified scheduling period (160 ms) only has contents of the scheduling information of MCH1 and MCH2, and the third unified scheduling period (160 ms) has contents of the scheduling information of the MCH1, MCH2 and MCH3, and the fourth unified scheduling period (160 ms) only has contents of the scheduling information of the MCH1 and MCH2. These four unified scheduling periods (160 ms) compose one allocation period, as shown in FIG. 5. It can be known from the FIG. 5, MCH1 and MCH2 are scheduled 4 times in the 640 ms allocation period, the MCH3 is scheduled twice, and the MCH4 is only scheduled once.

If the MCCH is born, then the MCCH is born before the DSI-t, and if the MTCHs are born, then the MTCHs are born after the DSI-t.

DSI-t is born on one or more MBSFN subframes, and the network side selects the corresponding MCS for this DSI-t, if the DSI-t is born on one subframe therein, for example, the first subframe also bears the MCCH, then the MCS of the DSI-t and the MCH of the MCCH are the same, and this MCS, namely the MCS of the MCCH is configured on the system broadcast message; if one or more MBSFN subframe bearing the DSI-t do not have the MCCH, then the MCS of DSI-t uses the MCS of MCH multiplexed with the MTCH, and this MCS is configured in the MCCH contents, namely the MCCH is configured with the MCSs of all the MCHs, but the MCS of the DSI-t uses the contents of one MCH, or the DSI-t still uses the MCS of the MCCH, or the DSI-t uses the MCS configured by the system broadcast message or MCCH.

(2) when UE is required to receive the MBMS service, the UE reads the scheduling information of the MBMS services of each MCH in this MBSFN area from the MCH channel bearing said DSI-t, and receives the MBMS services on different MCHs according to the read scheduling information.

If one subframe in one or more MBSFN subframes bearing the DSI-t also bears the MCCH, it is generally the first subframe, at this time the UE can obtain the MCS of the MCCH in advance by reading the system broadcast message, and further UE can know the same MCS used by the DSI-t. If the subframe bearing the DSI-t also bears one MTCH or more MTCHs, this or these MTCHs also use this MCS.

If one or more MBSFN subframes bearing the DSI-t do not bear the MCCH, at this time UE can obtain the MCS of the MCH bearing the DSI-t in advance by reading the content of the MCCH, or UE still reads the MCS of the MCCH on the system broadcast message, or UE read the content of the system broadcast message or MCCH to obtain the MCS of this DSI-t, and further UE can know the MCS used by the DSI-t.

A plurality of MCHs of one MBSFN area can be configured with the same scheduling period for the convenience, and at this time, the unified scheduling period and the allocation period are also the same and are also equal to the scheduling period. Thus, the DSI-t on each unified scheduling period includes the dynamic scheduling information of all the MCHs.

Example two, a system for transmitting dynamic scheduling information comprises:

a network side device, which is used for bearing the scheduling information of the MBMS services born on each MCH in one MBSFN area on one MCH to send.

UE is used for reading the scheduling information of the MBMS services born on each MCH in said MBSFN area on the MCH bearing said scheduling information and receiving the MBMS services born on different MCHs according to the read said scheduling information.

Other implementation details are the same as the described in example one.

Example three, a network side device of the system for supporting to transmit dynamic scheduling information, and this network side device is used for bearing the scheduling information of the MBMS services born on each MCH in one MBSFN area on one MCH to send.

Other implementation details are the same as the described in example one.

Certainly, the present invention can also have various embodiments, various corresponding modifications or transformations can be made according to the present invention by those having ordinary skills in the art without departing from the spirit or essentiality of the present invention, and all modifications, equivalent substitutions and improvements made in the sprit or principle of the present invention shall all fall into the protection scope of the appended claims of the present invention.

INDUSTRIAL APPLICABILITY

The technical scheme of the present invention provides a scheme for transmitting dynamic scheduling information of the MBMS service regarding the scenario of a plurality of MCHs, which enables the receiving end to correctly obtain the specific location information of the MBMS service requiring receiving in one scheduling period, and specifically, when the UE is required to receive a plurality of MBMS services at the same time, the UE can obtain the dynamic scheduling information of these MBMS services at a time, thereby avoiding the UE reading the dispersed dynamic scheduling information at a plurality of times, saving the power of the UE, improving the receiving efficiency, and having a higher sending efficiency of the radio interface signaling.

What is claimed is:

1. A method for transmitting dynamic scheduling information, comprising:
    a network side bearing a dynamic scheduling information (DSI) of Multimedia Broadcast Multicast Services (MBMS) on a Multicast Channels (MCH) in one Multicast Broadcast over Single Frequency Network (MBSFN) area to send;
    said network side bearing the DSI and a Multicast Control Channel (MCCH) on different MBSFN subframes; and
    selecting a corresponding Modulation Coding Scheme (MCS) for said DSI, wherein
    said network side uses a MCS of a MCH multiplexed with a Multicast Traffic Channel (MTCH) together as the MCS of said DSI.

2. The method as claimed in claim 1, wherein
    said network side sends the DSI of each MCH at the occasion of a scheduling period of each MCH own respectively.

3. The method as claimed in claim 2, which further comprises:

when user equipment is required to receive MBMS services, said user equipment reading scheduling information of the MBMS services born on each MCH in said MBSFN area from each MCH bearing said DSI, and receiving the MBMS services born on different MCHs according to read scheduling information.

4. The method as claimed in claim 1, wherein, said network side bearing the DSI in a Media Access Control Control Element (MAC CE) of one or more MBSFN subframes of said MCH to send.

5. The method as claimed in claim 1, which further comprises:

when user equipment is required to receive MBMS services, said user equipment reading scheduling information of the MBMS services born on each MCH in said MBSFN area from each MCH bearing said DSI, and receiving the MBMS services born on different MCHs according to read scheduling information.

6. A network side device of a system for supporting to transmit dynamic scheduling information, said network side device being configured to bear a dynamic scheduling information (DSI) of Multimedia Broadcast Multicast Services (MBMS) a Multicast Channels (MCH) in one Multicast Broadcast over Single Frequency Network (MBSFN) area to send;

said network side device being further configured to:

bear the DSI and a Multicast Control Channel (MCCH) on different MBSFN subframes; and use a MCS of a MCH multiplexed with a Multicast Traffic Channel (MTCH) together as the MCS of said DSI.

7. The network side device as claimed in claim 6, wherein said network side device sends the DSI of each MCH at the occasion of a scheduling period of each MCH own respectively.

8. A system for transmitting dynamic scheduling information, which comprises the network side device as claimed in claim 7 and user equipment, wherein said user equipment is configured to: read scheduling information of MBMS services born on each MCH in said MBSFN area from the MCH bearing said scheduling information when the MBMS services require receiving, and receive the MBMS services born on different MCHs according to read scheduling information.

9. The network side device as claimed in claim 6, wherein:

said network side device bears the DSI in a Media Access Control Control Element (MAC CE) of one or more MBSFN subframes of said MCH to send.

10. A system for transmitting dynamic scheduling information, which comprises the network side device as claimed in claim 9 and user equipment, wherein said user equipment is configured to: read scheduling information of MBMS services born on each MCH in said MBSFN area from the MCH bearing said scheduling information when the MBMS services require receiving, and receive the MBMS services born on different MCHs according to read scheduling information.

11. A system for transmitting dynamic scheduling information, which comprises the network side device as claimed in claim 6 and user equipment, wherein said user equipment is configured to: read scheduling information of MBMS services born on each MCH in said MBSFN area from the MCH bearing said scheduling information when the MBMS services require receiving, and receive the MBMS services born on different MCHs according to read scheduling information.

* * * * *